United States Patent [19]

Yoshikawa et al.

[11] 3,757,167
[45] Sept. 4, 1973

[54] REVOLUTIONS MEASURING INSTRUMENT

[75] Inventors: Isao Yoshikawa; Takeshi Ochiai, both of Toyota, Japan

[73] Assignee: Toyota Jidosha Kogyo Kabushiki Kaisha, Toyota-shi, Japan

[22] Filed: Mar. 24, 1972

[21] Appl. No.: 237,620

[30] Foreign Application Priority Data
June 15, 1971 Japan.................................. 46/42835

[52] U.S. Cl. ................. 317/5, 303/21 CE, 324/160
[51] Int. Cl. ............................................. G01p 3/48
[58] Field of Search................. 317/5, 19; 303/21 C, 303/21 CF, 21 CG; 324/160, 161, 178, 179, 186; 307/225

[56] References Cited
UNITED STATES PATENTS
2,874,900   2/1959   Linderman...................... 324/161 X
3,589,776   6/1971   Wehde............................ 303/21 CF
3,586,385   6/1971   Florus et al..................... 303/21 EB OTHER PUBLICATIONS
"Computer and Apparatus for Measuring Rotational Speed" IBM Technical Disclosure Bulletin, Vol. 13, No. 4, Sept. 1970

Primary Examiner—J. D. Miller
Assistant Examiner—Harry E. Moose, Jr.
Attorney—John W. Malley, G. Lloyd Knight et al.

[57]  ABSTRACT

An instrument for measuring the revolutions of a rotary body comprising a speed pulse generator for generating a first train of pulses including, in a unit length of time, pulses of the number proportional to the revolutions of the rotary body, a reference pulse generator for generating a second train of pulses including a certain number of pulses in a unit time, and first and second counters for counting the number of pulses appearing in the first and second pulse trains respectively during a counting cycle starting with a certain pulse in the first pulse train; wherein the counting operations of both the counters are stopped simultaneously with the appearance of the first pulse of the first pulse train immediately following the time at which the second counter has counted a predetermined number of pulses, and the number counted by the first counter is divided by the number counted by the second counter, thereby measuring the revolutions of the rotary body.

5 Claims, 7 Drawing Figures $T_D = T + T_P + T_R$

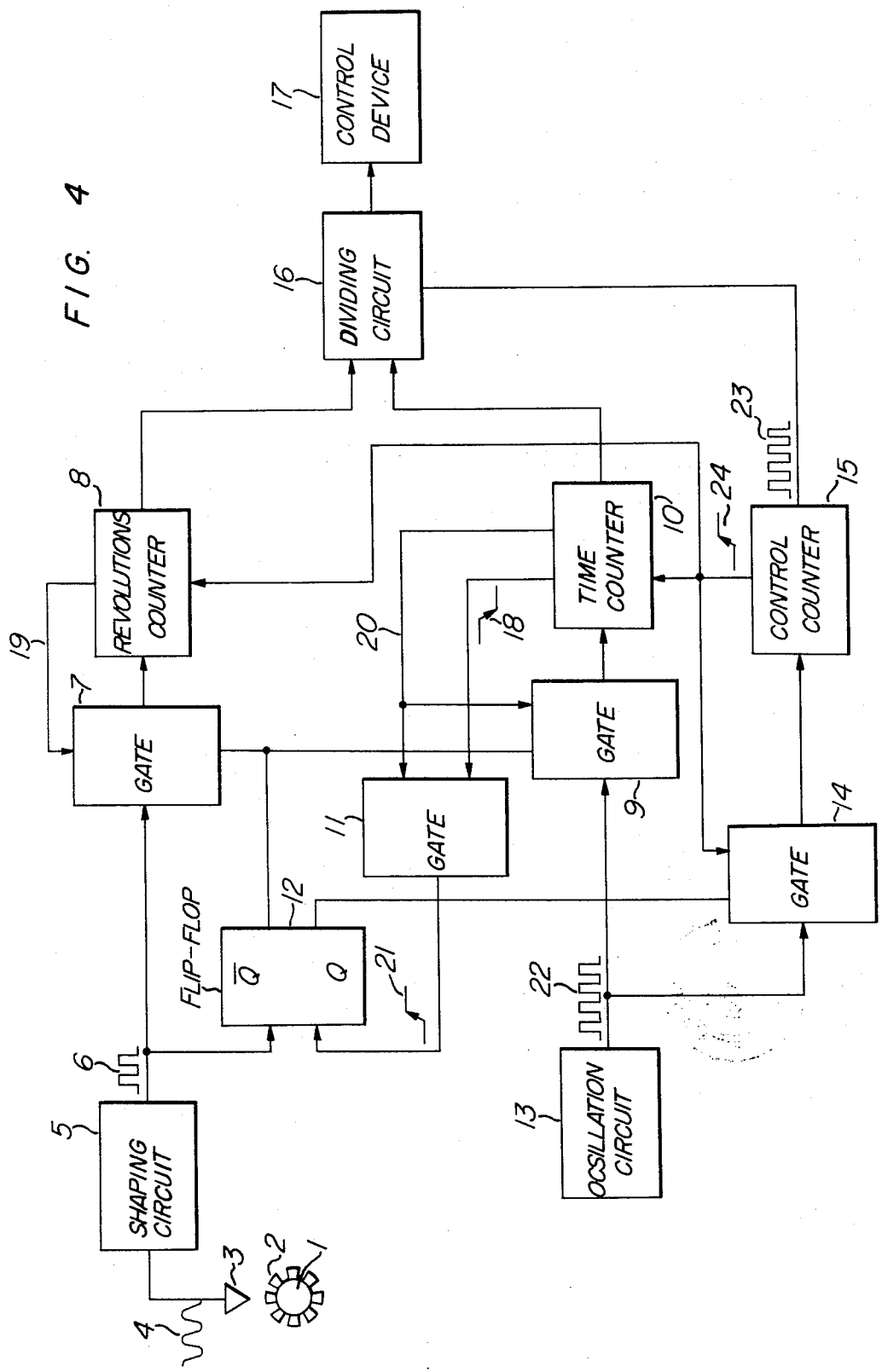

REVOLUTIONS MEASURING INSTRUMENT

FIELD OF THE INVENTION

This invention relates to a revolutions measuring instrument capable of performing within a short period of time digital measurement, with high constant accuracy, of a wide range of revolutions from low to high speeds.

BRIEF DESCRIPTION OF THE DRAWINGS

FIG. 4 is a block diagram showing an embodiment of the invention.

DESCRIPTION OF THE PRIOR ART

Figure 1:
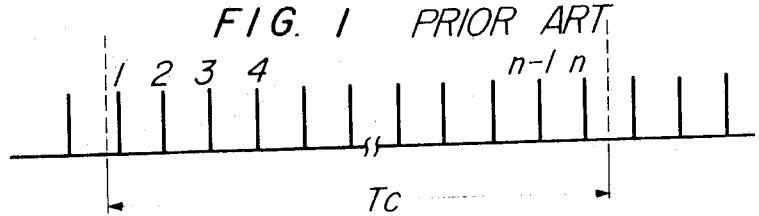
FIGS. 1 and 2 are diagrams showing the operating principle of a prior art revolutions measuring instrument.

There are two main methods of detecting the revolutions in the form of digital signals in such systems as an anti-skid device, electronic fuel injection device and vehicle speed automatic control device. One is to convert the wheel revolutions into a pulse train by means of a gear and a pickup and count the number of pulses appearing during a certain time $T_C$ as shown in FIG. 1. The other consists in measuring the period t of the pulse signals and obtain the frequency f by a dividing circuit. Due to the errors which usually accompany the digital measurement, the measurement accuracy drops as the revolutions becomes less in the first method, while the accuracy becomes lower as the wheel speed becomes higher in the second method.

SUMMARY OF THE INVENTION

Accordingly, it is an object of the present invention to overcome the disadvantages of the conventional instruments and to provide a revolutions measuring instrument which is capable of maintaining an almost constant measurement accuracy and which requires only a short time in measuring low rotational speed.

Another object of the present invention is to provide a revolutions measuring instrument suitable for the driving control of an automobile.

The revolutions measuring instrument according to the present invention comprises a speed pulse generator for generating a first train of pulses including, in a unit length of time, pulses of the number proportional to the revolutions of a rotary body of which the revolutions are intended to be measured, a first counter for counting the number of pulses in the first pulse train and storing the result, a reference pulse generator for generating a second pulse train containing a certain number of pulses in a unit length of time and a second counter for counting the number of pulses in said second pulse train; wherein the first and second counters count the number of pulses appearing in the first and second pulse trains respectively during a counting cycle starting with a certain pulse in the first pulse train, the counting operations of both the counters are stopped simultaneously with the appearance of the first pulse of the first pulse train immediately following the time point at which the second counter has counted a predetermined number of pulses, and the number counted by the first counter is divided by the number counted by the second counter, thereby measuring the revolutions of the rotary body.

Therefore, it is possible, according to the present invention, to obtain highly accurate measurement results with only a short time delay. This fact makes the instrument of the invention quite suitable for use with an anti-skid device, electronic fuel injection device and vehicle speed automatic control device, as well as the frequency measuring instrument. Further, this invention is applicable with high accuracy to a frequency measuring instrument for general use.

DESCRIPTION OF THE PREFERRED EMBODIMENTS

Figure 3:
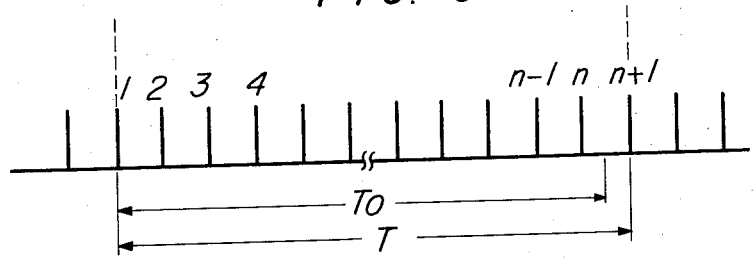
FIG. 3 is a diagram for explaining the principle of operation of the revolutions measuring instrument according to the present invention.
Figure 6:
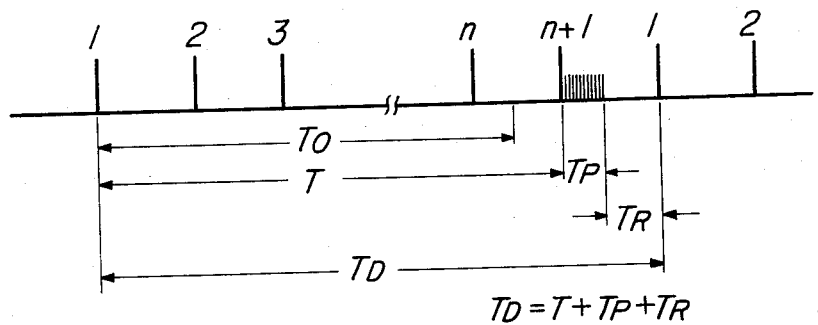
FIG. 6 is a diagram for explaining the response time of the instrument according to the present invention.

The operating principle of the present invention will be explained with reference to FIG. 3. The symbol $T_0$ shows a predetermined time which has elapsed after the starting of counting operation and the symbol T the time which has elapsed after the starting of the counting operation until the time point where the $(n + 1)$th pulse appears, which is the first pulse after the elapsing of $T_0$. The time T and the number of n pulses appearing within the time period of $T_0$ are counted by two binary counters. Then the results are applied to a dividing circuit in the next stage, where n is divided by T to obtain the wheel revolutions.

A block diagram for embodying the above-described principle is shown in FIG. 4.

In this drawing, wheel revolutions are converted into an AC signal 4 with the frequency proportional to the revolutions by means of an electromagnetic pick-up 3 and a gear 2 mounted on the wheel 1. The AC signal 4 is shaped into a rectangular pulse train 6 by a shaping circuit 5 and applied to the input terminal of the gate 7 and the clock input terminal of the flip-flop 12. The flip-flop 12 produces a signal by way of the portion $\bar{Q}$ in response to the first signal of the pulse train 6 which appears after the disapperance of the signal 21 applied from the gate 11, thereby opening the gates 7 and 9 to start a counting cycle. The revolutions counter 8 is for counting the n pulses of the train 6, while at the same time the counter 10 counts the reference pulses 22 applied thereto from the oscillation circuit 13 through the gate 9. When the counter 10 has completed the counting of pulses appearing during the time $T_0$, the signal 18 is applied to the gate 11, wherefrom the signal 21 is applied to the input terminal of the flip-flop 12. The feedback line 19 is provided for the purpose of closing the gate 7 by predicting the overflow of the counter 8 when it reaches the maximum number countable within the time $T_0$, while the feedback line 20 closes the gates 11 and 9 when the counter 10 has continued the counting operation for the time $2T_0$. The flip-flop 12 may consist of a J-K master slave flip-flop of such a constuction that an input signal applied to the next stage is delayed by the time period corresponding to one pulse, so that the input signal appears at the output portions Q and $\bar{Q}$ a certain time later. This delayed pulse is synchronized with the revolutions pulse applied to the clock input terminal to produce at the output terminal Q a signal of high potential of the same polarity as the input signal 21. This pulse opens the gate 14 to allow the reference pulse 22 to enter the control counter 15. On the other hand, another signal of opposite polarity and low potential appears at the output terminal $\bar{Q}$, whereby the gates 7 and 9 are closed and the counters 8 and 10 stop the counting operation thereby to complete a counting cycle.

Thus the revolutions counter 8 stores the number of pulses appearing during the time period $T_0$, while the time counter 10 stores the pulse train length T which meets the predetermined requirements. The signals stored in both of these counters are read in the dividing circuit 16 in accordance with control pulse train 23 produced by the control counter 15, and the dividing circuit 16 produces a pulse signal, which may be a number of pulses corresponding to a binary number representative of $n$ divided by T, and the pulse signal, is as a rotating speed, applied to the control device 17.

On completion of the dividing operation, the gate 14 is closed by the signal 24 and the counters 8 and 10 are reset whereby the signals 18 and 21 disappear, until the next appearing pulse train 6 opens the gates 7 and 9 to start the next counting cycle.

The feature of the revolutions detecting means according to the invention described above lies in the fact that the frequency of pulses proportional to the wheel revolutions is obtained by the digital calculation of n/T or the reciprocal of T/n which is an average frequency of the n pulses, in order to maintain the measurement accuracy and response speed required by the characteristics of the control device to which the invention is applied.

Explanation will be made now of an embodiment of the invention as applied to the anti-skid device of the automobile.

In many of the conventional methods of digital measurement of wheel revolutions employed in the anti-skid device, pulses converted from the wheel revolutions are counted as shown in FIG. 1. In these methods, detection of a sudden change in wheel revolutions is delayed, and the control characteristics of the control device are adversely affected by the failure to count even a single pulse.

According to the present invention, the number $n$ of pulses and time T are counted separately from each other by different counters, and the counting results obtained from the two counters are utilized to obtain the wheel revolutions, thereby making it possible to detect any revolutions quickly with high and constant accuracy.

Explanation will be made now of how accurately the wheel revolutions are measured with the calculation circuit according to the present invention. It is assumed that $T_0$ is 10ms, that the oscillation frequency of the oscillation circuit 13 is 100 KHz and that a pick-up is used which produces pulses of 1,000 Hz at the vehicle speed of 50 Km/h. The revolutions counter 8 and the time counter 10 start and stop counting operation in synchronism with the wheel revolutions pulses, but the reference time pulses 22 counted by the time counter 10 are out of phase with the wheel revolutions pulses. Therefore, it will be understood that the counting error of 1 bit accompanying the digital measurement is produced by the time counter 10. The time counter 10, which is a binary counter with 12 digits, is adapted to count the number of reference time pulses occurring during the time $2T_0$, when the signal 18 is produced simultaneously with the revolutions pulses. As a result, when the vehicle is running at the speed of 5 Km/h, 2,000 reference time pulses are counted. The counting error in this case is 1/2000 or 0.05 percent, whereas the counting error is 0.1 percent or less at the vehicle speed of 150 Km/h when the revolutions counter reaches the overflow state. As can be seen from above, the error in the measurement of the wheel revolutions according to the present invention is always 0.1 percent or less. When the vehicle speed exceeds the 150 Km/h, the gate 7 is closed by the feedback line 19 from the revolutions counter 8, so that the information stored in the counter 8 is maintained constant at 30, while the information stored in the counter 10 approaches but never exceeds 1,000 that is the number of the reference time pulses occurring during the time $T_0$. On the other hand, when the vehicle speed becomes lower than 2.5 Km/h to close the gate 9 by means of the feed back line 20 of the time counter 10, the information stored in the counter 8 becomes 1, while the one stored in the time counter 10 is maintained at 2,000. Thus it is possible to control the measurement of the wheel speed by means of the feed back lines 19 and 20.

Figure 2:
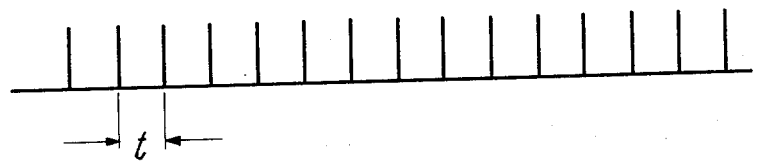
Figure 5:
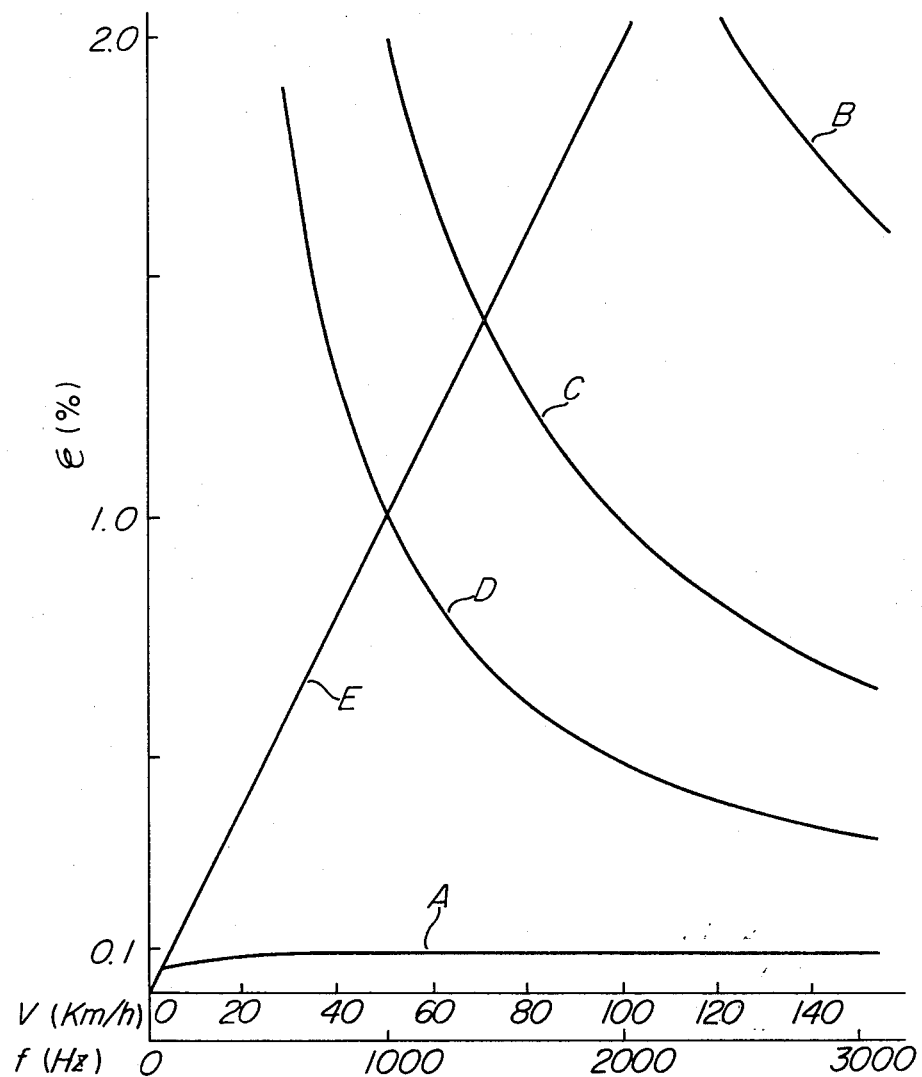
FIG. 5 is a diagram for comparing the measurement accuracy between the conventional instruments and the instrument according to the invention.

Now, let us compare the measurement accuracy between the device according to the invention and the prior art devices. Referring to FIG. 5, the abscissa represents the wheel revolutions V(Km/h) and the revolutions pulse frequency $f$(Hz), and the ordinate the measurement error in percent due to the counting error of 1 bit. It is assumed here that the error occurring in the measurement by the instrument of the invention is A, those occurring in the first conventional method of FIG. 1, B, C and D, and the one occurring in the measurement by the second conventional method as shown in FIG. 2 is E. The operating time for A varies between 10 ms and 20 ms depending on the vehicle speed. The gating times of B, C and D are fixed at 20 ms, 50 ms and 100 ms respectively. The operating time for E varies according to the vehicle speed. It is also assumed that the reference time pulse frequencies for A and E is 100 KHz. As will be seen from the drawing, the measurement error in the first conventional method is inversely proportional to the vehicle speed, while the error in the second conventional method changes greatly in proportion to the vehicle speed. In contrast, according to the present invention, the measurement error can be maintained almost constant below 0.1 percent. For example, when the vehicle speed is 100 Km/h, the error in the second conventional method is 2.0 percent and the error in the first conventional method 1.0 percent, whereas the error in the present invention is only about 0.095 percent.

Explanation will be made now of the delay time according to the invention under the above-mentioned conditions, i.e., when $T_0$ is 10 ms and the reference time pulse frequency 100 KHz. The delay time here means the period of time $T_D$ in sec. from the time point when a measurement result is obtained of the wheel revolutions V(Km/h) to the time point when the next measurement result is obtained. In other words, the delay time is the sum of the measurement time T, the time $T_P$ required to divide n by T and the idle time $T_R$ before the arrival of the first wheel revolutions pulse.

When T is greater than $T_0$ but not higher than $2T_0$, $$T = (1 + [20\ VT_0])\ 1/20V \text{ (sec.)} \quad (1)$$

where the square bracket [ ] shows the Gauss symbol or the maximum integral number derived from the calculation of the equation in the bracket. The $(1 + [20VT_0])$ at the right side of the equation (1) shows the number N of wheel revolutions pulses counted by the revolutions counter. The measurement time T is obtained by dividing N by the frequency 20V of the wheel revolutions pulses occurring at the speed of $V$. The symbol $T_P$ shows the 128 clock time required for the dividing operation of binary 11 digits, that is to say, $$T_P = 1.28 \ (ms) \quad (2)$$

There is a relationship between $T_R$ and wheel speed $V(Km/h)$ $$T_R = k/20V - T_P \quad (3)$$

where $k$ shows a positive integral number satisfying the condition $$k - 1/T_P < 20V < k/T_P \quad (4)$$

From above, the delay time in measurement $$T_D = T + T_P + T_R = (1 + [20VT_0]) \ 1/20V + k/20V \ (sec.) \quad (5)$$

where $k$ is obtained from the equation (4).

Figure 7:
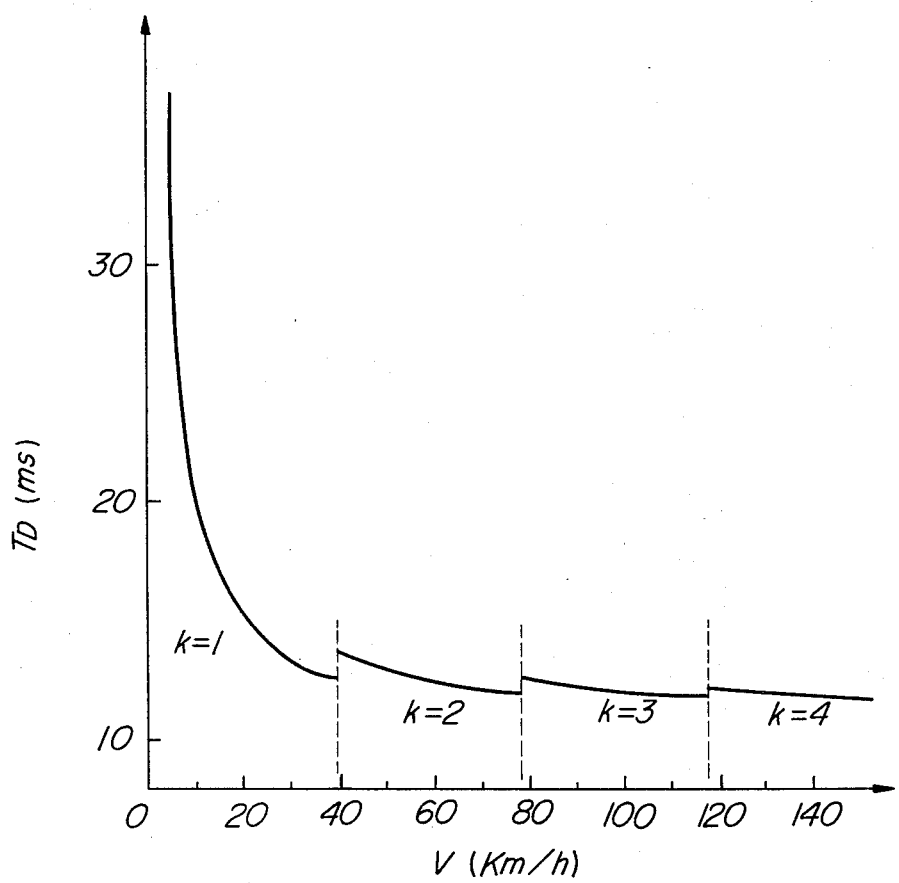
FIG. 7 is a diagram showing the relationship between said response time and revolutions.

FIG. 7 shows the relationship between $T_D$ and $V$ when $T_0$ is 10 ms and $T_P$ is 1.28 ms. The delay time $T_D$ never exceeds 14 ms when the speed B is not lower than 25 Km/h, evidently showing that the instrument according to the invention has a sufficiently high responsiveness as a vehicle speed detector for use with the anti-skid device.

We claim:

1. A system for measuring the revolutions of a rotary body comprising:
   a speed pulse generating means for generating a first pulse train containing in a unit length of time pulses of the number proportional to the revolutions of said rotary body,
   a reference pulse generating means for generating a second pulse train containing a certain number of pulses in a unit length of time,
   a first counter for counting and storing the information on the number of pulses in said first pulse train,
   a second counter for counting and storing the information on the number of pulses in said second pulse train,
   a control means for controlling the period of one counting cycle and causing the first and second counters to count pulses occurring in the first and second pulse trains respectively during said cycle, said counting cycle starting with the appearance of a certain pulse in the first pulse train and ending with the appearance of the first pulse of the first pulse train immediately following the time point at which time the second counter has counted a predetermined number of pulses, and
   a dividing means for dividing the number counted by the first counter during said counting cycle and stored in said first counter by the number counted by and stored in the second counter, thereby to calculate the revolutions of said rotary body.

2. A revolutions measuring system according to claim 1, wherein said second counter produces a signal when the number counted by said second counter reaches a predetermined value, and said control means comprises a first gate connected between said speed pulse generator and said first counter for alternating between the opened state where said first pulse train is allowed to pass to said first counter and the closed state where said first train is prevented from being applied to said first counter, a second gate connected between said reference pulse generator and said second counter for alternating between the opened state where said second pulse train is allowed to pass to said second counter and the closed state where said second pulse train is prevented from being applied to said second counter, and a flip-flop circuit for controlling said first and second gates, said flip-flop circuit applying to each gate a first gate that is the signal of the first pulse train first appearing in the absence of any signal in said second counter, said first signal opening said each gate, said flip-flop circuit also applying to each gate a second signal that is the signal of the first pulse train appearing in the presence of a signal in said second counter, said second signal closing said each gate.

3. A revolutions measuring system according to claim 2, further comprising a third counter for generating a control pulse train in synchronism with the second pulse train received from said reference pulse generating means, and a third gate inserted between said third counter and said reference pulse generating means for alternating between the opened state where said second pulse train is allowed to pass to said third counter and the closed state where said second pulse train is prevented from being applied to said third counter, said flip-flop circuit producing a third signal simultaneously with said second signal, said third signal being applied to said third gate to open the same, said dividing means being adapted to read out the information stored in said first and second counters in response to said control pulse.

4. A revolutions measuring system according to claim 2, in which each of said first and second counters comprises a feedback circuit for generating a signal which is applied to said first and second gates respectively thereby preventing a pulse from being applied to said each of the counters when said each counter has completed the counting of a predetermined number.

5. A revolutions measuring system according to claim 1, wherein a vehicle wheel speed is to be measured for determining the speed of a vehicle therefor and in which said rotary body rotates with revolutions proportional to the vehicle wheel speed, and the rotational speed obtained by said dividing means is used to control a drive of said vehicle.

* * * * *